United States Patent
Bunn, Sr. et al.

(10) Patent No.: US 10,794,524 B2
(45) Date of Patent: Oct. 6, 2020

(54) PIPE COUPLING ASSEMBLY

(71) Applicants: Keith R. Bunn, Sr., Grand Rapids, MI (US); Steven J. Griegelis, Jr., Grand Rapids, MI (US)

(72) Inventors: Keith R. Bunn, Sr., Grand Rapids, MI (US); Steven J. Griegelis, Jr., Grand Rapids, MI (US)

(73) Assignee: Keith R. Bunn, Sr., Grand Rapids, MI (US)

( * ) Notice: Subject to any disclaimer, the term of this patent is extended or adjusted under 35 U.S.C. 154(b) by 429 days.

(21) Appl. No.: 15/623,945

(22) Filed: Jun. 15, 2017

(65) Prior Publication Data

US 2018/0066783 A1 Mar. 8, 2018

Related U.S. Application Data

(60) Provisional application No. 62/383,800, filed on Sep. 6, 2016.

(51) Int. Cl.
| | |
|---|---|
| *F16L 37/113* | (2006.01) |
| *F16L 47/08* | (2006.01) |
| *F16L 47/14* | (2006.01) |
| *F16L 37/133* | (2006.01) |
| *E03C 1/284* | (2006.01) |
| *F16L 9/12* | (2006.01) |
| *E03C 1/14* | (2006.01) |

(52) U.S. Cl.
CPC ............ *F16L 47/08* (2013.01); *E03C 1/284* (2013.01); *F16L 37/133* (2013.01); *F16L 47/14* (2013.01); *E03C 1/14* (2013.01); *F16L 9/12* (2013.01)

(58) Field of Classification Search
CPC ....... F16L 21/005; F16L 21/03; F16L 37/107; F16L 37/113; F16L 37/248
USPC .................................................. 285/376, 377
See application file for complete search history.

(56) References Cited

U.S. PATENT DOCUMENTS

| | | | | |
|---|---|---|---|---|
| 2,823,699 | A * | 2/1958 | Willis | F16L 37/113 137/625.26 |
| 3,104,400 | A | 9/1963 | Lantz et al. | |
| 3,227,380 | A * | 1/1966 | Pinkston | E03C 1/084 239/427 |

(Continued)

FOREIGN PATENT DOCUMENTS

| | | | |
|---|---|---|---|
| DE | 3901425 A1 | 7/1990 | |
| DE | 102004012817 A1 * | 10/2005 | ............ F16L 37/107 |
| FR | 385508 A | 5/1908 | |

*Primary Examiner* — David Bochna
(74) *Attorney, Agent, or Firm* — Warner Norcross + Judd LLP

(57) ABSTRACT

A pipe coupling assembly for coupling a first end portion of a first pipe with a second pipe includes a socket formed on an end of the second pipe and a locking ring. The socket includes a rim defining an end opening through which at least a portion of the first end portion is inserted, the rim including a rim sealing surface adapted to form a liquid-tight seal around the first end portion. The socket also includes a sleeve portion having an exterior surface and an interior surface defining an interior space for receiving the first end portion, the interior surface comprising at least two socket sealing surfaces adapted to form a liquid-tight seal around the first end portion. The locking ring is adapted to cause the rim sealing surface to compress to form a liquid-tight seal around the first end portion.

18 Claims, 14 Drawing Sheets

(56) References Cited

U.S. PATENT DOCUMENTS

| | | | | |
|---|---|---|---|---|
| 3,459,446 | A * | 8/1969 | Walsh | F16L 37/113 |
| | | | | 285/362 |
| 3,649,052 | A * | 3/1972 | Snyder, Jr. | F16L 37/248 |
| | | | | 285/38 |
| 3,913,928 | A * | 10/1975 | Yamaguchi | F16L 25/10 |
| | | | | 277/604 |
| 4,586,203 | A | 5/1986 | Westgerdes | |
| 5,997,003 | A | 12/1999 | Turner | |
| 6,123,367 | A * | 9/2000 | Miller | B60R 15/00 |
| | | | | 137/899 |
| 6,170,882 | B1 * | 1/2001 | Prest | F16L 37/248 |
| | | | | 285/12 |
| 6,481,763 | B2 | 11/2002 | Mintz et al. | |
| 6,755,446 | B2 | 6/2004 | Mintz et al. | |
| 7,744,018 | B2 * | 6/2010 | Alexander | F16L 33/223 |
| | | | | 239/124 |
| 9,057,185 | B2 | 6/2015 | Childs et al. | |
| 9,303,804 | B2 | 4/2016 | Ismert | |
| 9,322,157 | B1 * | 4/2016 | Ismert | F16L 37/248 |
| 2001/0013700 | A1 * | 8/2001 | Mintz | F16L 37/113 |
| | | | | 285/360 |
| 2004/0239106 | A1 * | 12/2004 | Lanteigne | F16L 21/03 |
| | | | | 285/110 |
| 2007/0216161 | A1 * | 9/2007 | Regener | F16L 37/113 |
| | | | | 285/377 |
| 2008/0258463 | A1 * | 10/2008 | Horikawa | F16L 37/113 |
| | | | | 285/362 |
| 2009/0295102 | A1 * | 12/2009 | McKenzie | F16L 21/03 |
| | | | | 277/617 |
| 2010/0314863 | A1 * | 12/2010 | Ohara | F16L 37/113 |
| | | | | 285/31 |
| 2012/0180210 | A1 | 7/2012 | Hanson et al. | |
| 2016/0273685 | A1 * | 9/2016 | Considine | F16L 37/113 |

\* cited by examiner

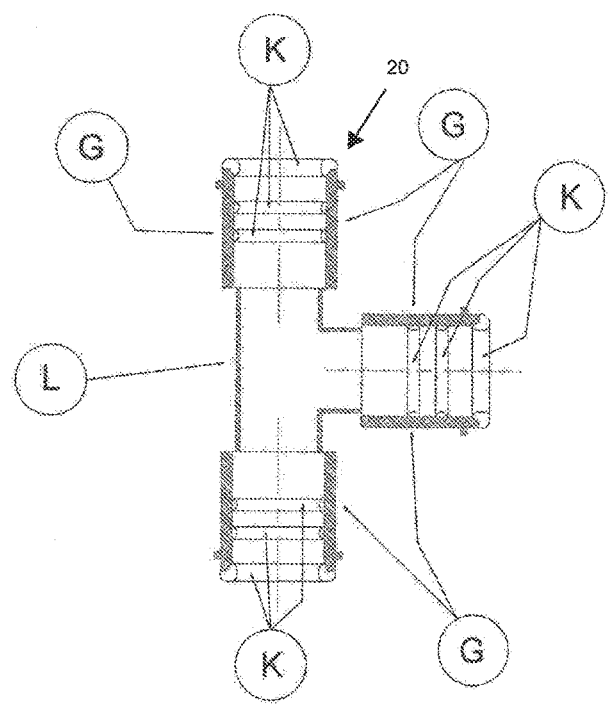
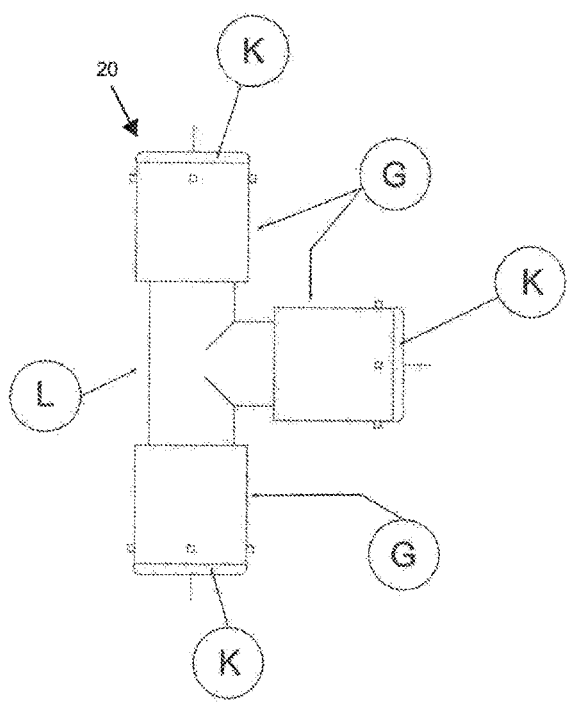
FIG. 8A
FIG. 8B

PIPE COUPLING ASSEMBLY

This application claims the benefit of provisional application Ser. No. 62/383,800 filed Sep. 6, 2016, which is incorporated by reference in its entirety herein.

BACKGROUND

The present disclosure relates to a pipe coupling assembly for addressing issues related to leakage between coupled pipes in a simple, easy to use manner.

Transporting liquid from one location to another through a pipe system typically requires coupling multiple pipes together. Each point of coupling is a potential source of leakage for the liquid being transported through the pipe system. For example, transporting liquid from a residential or commercial sink to a drain typically includes a drain system formed from multiple pipes coupled together. Addressing leaks in the drain system is a common problem encountered in the plumbing field. Consumers will often try to repair leaks on their own without the aid of a professional plumber, however, the results are often not satisfactory and leaks will re-occur. Even professional plumbers can encounter difficulties in addressing some coupling leaks. For example, a drain trap can account for up to 80% of the leaks in an under-sink drain system.

SUMMARY

In some embodiments, the present disclosure relates to a pipe system for transporting liquid. The pipe system includes a first pipe having a first end portion and a second pipe having a socket formed in a second end portion of the second pipe. The socket is adapted to receive the first end portion of the first pipe therein and the socket includes a rim defining an end opening through which the portion of first end portion of the first pipe is inserted into the socket. The rim includes a rim sealing surface adapted to form a liquid-tight seal around the first end portion. The socket also includes a sleeve portion including an exterior surface and an interior surface defining an interior space for receiving the first end portion. The interior surface includes at least two socket sealing surfaces adapted to form a liquid-tight seal around the first end portion. A locking ring couples the first pipe and the second pipe and includes a first end and a second end connected by a body portion. The first end has a flange defining an opening through which the first end portion of the first pipe is inserted and is adapted to engage the rim sealing surface when the locking ring surrounds the socket. A plurality of projections extends from one of the exterior surface of the sleeve portion or an interior surface of the body portion. The other of the exterior surface of the sleeve portion or the interior surface of the body portion includes a plurality of channels adapted to receive the plurality of projections. Each channel includes a channel inlet connected with a channel end portion by a neck portion, the neck portion extending at an angle relative to the second pipe rim. The locking ring is adapted to move relative to the socket between (a) an unlocked condition in which the locking ring surrounds the socket and each of the channel inlets is aligned with one of the plurality of projections, and (b) a locked condition in which the projection is received within the channel end portion. When the locking ring is placed over the socket in the unlocked condition and the first end portion is inserted into the socket through the locking ring opening, rotation of the locking ring from the unlocked to the locked condition draws the flange toward the rim sealing surface. The flange compresses the rim sealing surface to form the liquid-tight seal around the first end portion. When the locking ring is in the locked condition, the compressed rim sealing surface and the at least two socket sealing surfaces provide at least three liquid-tight seals around the first end portion of the first pipe.

According to another embodiment, a pipe coupling assembly includes a socket including a sleeve portion having an exterior surface and an interior surface defining an interior of the socket. A rim defines an opening into the interior of the socket and a rim sealing surface surrounds the rim and is adapted to form a liquid-tight seal. At least two socket sealing surfaces are disposed in the interior surface of the sleeve portion and adapted to form a liquid-tight seal. A locking ring is adapted to receive the socket and includes a first end and a second end connected by a body portion having an interior surface. The first end has a flange adapted to engage the rim sealing surface when the locking ring surrounds the socket. A plurality of projections extends from one of the exterior surface of the sleeve portion or the interior surface of the body portion. The other of the exterior surface of the sleeve portion or the interior surface of the body portion includes a plurality of channels adapted to receive the plurality of projections. Each channel includes a channel inlet connected with a channel end portion by a neck portion. The neck portion extends at an angle relative to the second pipe rim. The locking ring is adapted to move relative to the socket between (a) an unlocked condition in which the locking ring surrounds the socket and each of the channel inlets is aligned with one of the plurality of projections, and (b) a locked condition in which the projection is received within the channel end portion and the flange compresses the rim sealing surface. The compressed rim sealing surface and the at least two socket sealing surfaces provide at least three liquid-tight seals around an end portion of a pipe inserted into the socket.

According to yet another embodiment, a pipe coupling assembly includes a first pipe having a first end portion including a first rim defining an opening into an interior of the first pipe. A shoulder extends at least partially around a circumference of the first pipe adjacent the first rim. A second pipe includes a socket formed in a second end portion of the second pipe. The socket is adapted to receive at least a portion of the first end portion therein. The socket includes a rim defining an opening through which the first end portion is inserted into the socket. The rim includes a rim sealing surface adapted to form a liquid-tight seal around the first end portion. A sleeve portion has an exterior surface and an interior surface defining an interior space for receiving the first end portion. The interior surface includes at least two socket sealing surfaces adapted to form a liquid-tight seal around the first end portion. A locking ring couples the first pipe and the second pipe. The locking ring includes a first end and a second end connected by a body portion, the first end having a flange defining an opening through which the first end portion of the first pipe is inserted. A first locking element is disposed on an exterior surface of the shoulder or the socket and a second locking element is disposed on an interior surface of the locking ring. The first locking element is adapted to engage the second locking element such that rotation of the locking ring from an unlocked condition to a locked condition draws the shoulder and the socket toward one another. The rim sealing surface is compressed between the flange and the shoulder. When the locking ring is in the locked condition, the compressed rim sealing surface and the at least two socket sealing surfaces provide at least three liquid-tight seals around the first end portion of the first pipe.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 8A is a cross-sectional view of a portion of a pipe coupling assembly according to an embodiment of the invention;

FIG. 8B is a side view of a portion of a pipe coupling assembly according to an embodiment of the invention;

and

Figure 12:
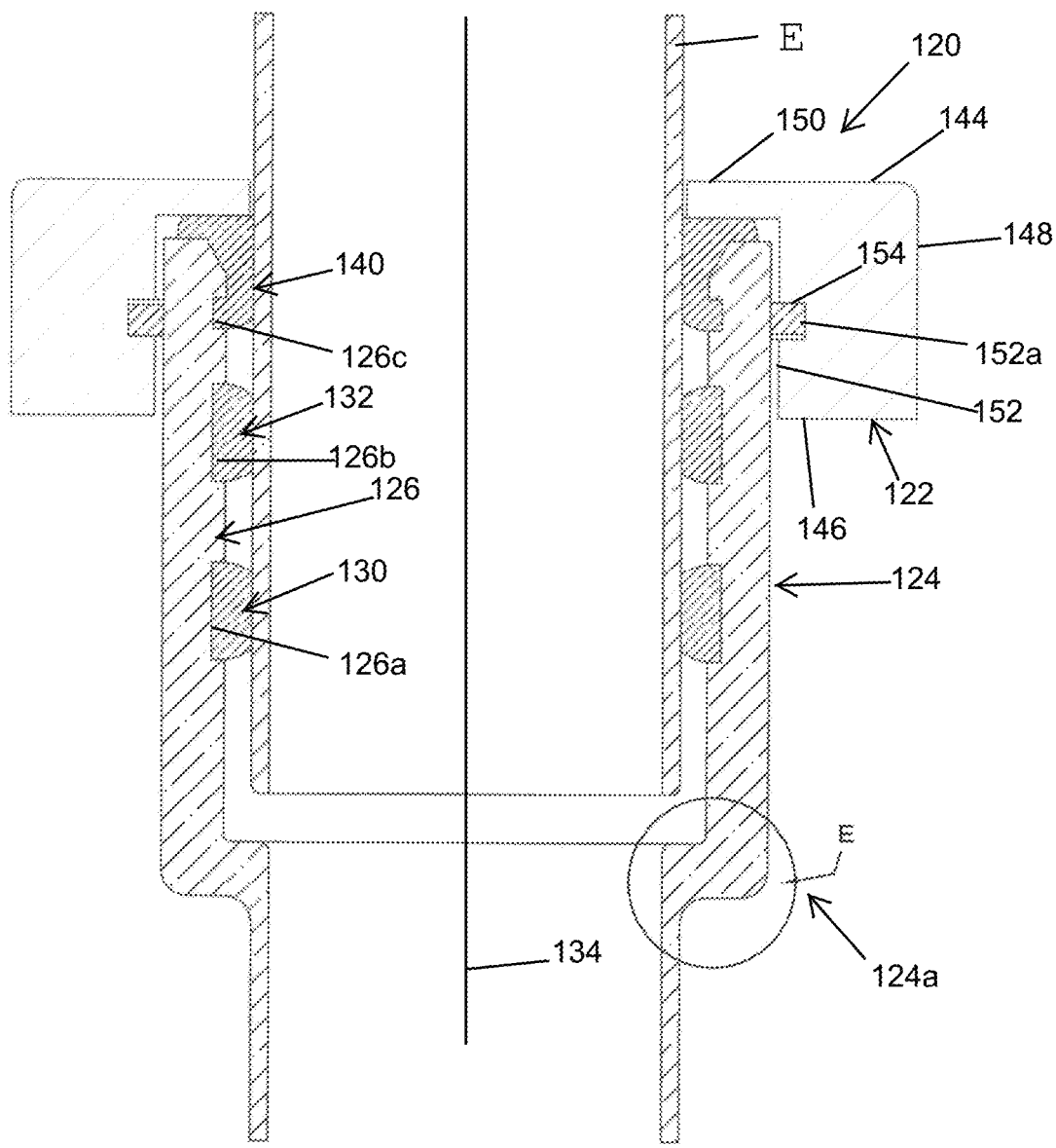
FIG. 12 is a section view of another embodiment of a pipe coupling assembly illustrating the sealing surfaced in their fully compressed portions.
Figure 15:
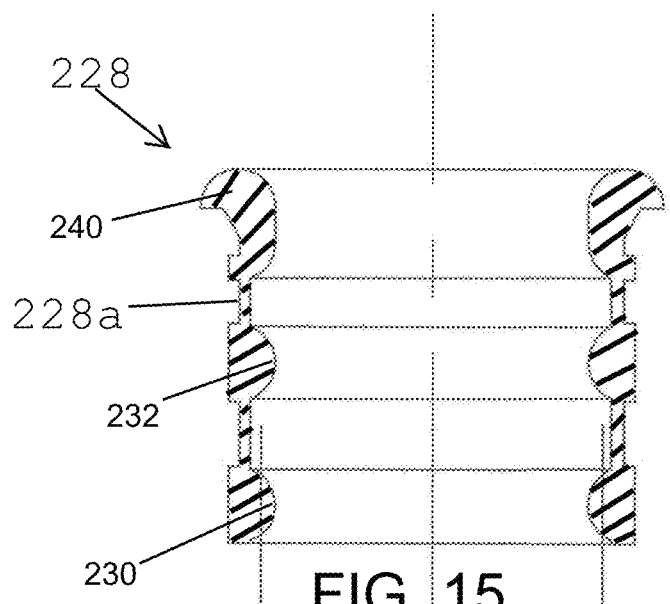

FIG. 15 is a similar view to FIG. 12 but with the socket removed to better illustrate the sealing assembly.

DETAILED DESCRIPTION OF THE EMBODIMENTS

Referring to FIGS. 1A-1E, a pipe system 10, illustrated as a drain system, includes multiple pipes, such as drain pipe F, a T-shaped pipe H, a liquid trap I, and a cross-over pipe J, coupled together to transport liquid. In one embodiment, pipe system 10 is in the form of a drain system 10 for transporting liquid from a sink basin 12 to a drain (not shown). Each of the pipes F, H, I, J of drain system 10 is coupled to an adjacent pipe F, H, I, J by a pipe coupling assembly 20 described herein. While pipe coupling assembly 20 is described in the context of an under-sink drain system, it will be understood that pipe coupling assembly 20 can be used to couple adjacent pipes in any liquid transporting pipe system. Pipe coupling assembly 20 can be used alone in a liquid transporting pipe system or in combination with other types of coupling assemblies. The components of drain system 10 and pipe coupling assembly 20 can be made from any suitable material or combination of materials, non-limiting examples of which include metal and polymeric materials.

Figure 1:
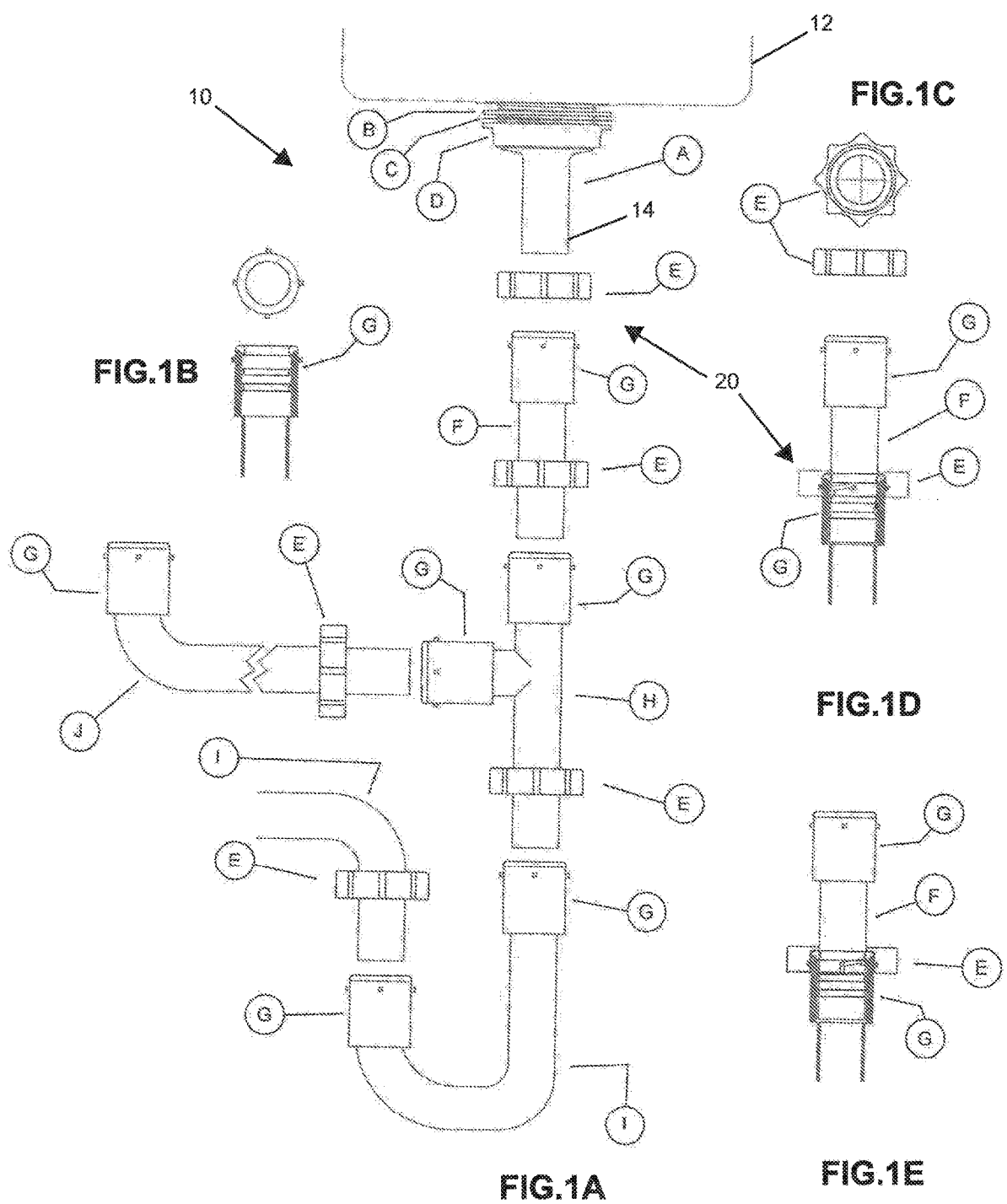
FIG. 1A is a side view of a drain system and pipe coupling assembly according to an embodiment of the invention.
FIG. 1B is a cross-sectional and top down view of a portion of the pipe coupling assembly of FIG. 1A.
FIG. 1C is a top down and side view of a portion of the pipe coupling assembly of FIG. 1A.
FIG. 1D is a cross-sectional view of a portion of the pipe coupling assembly of FIG. 1A.
FIG. 1E is a cross-sectional view of a portion of the pipe coupling assembly of FIG. 1A.
Figure 2:
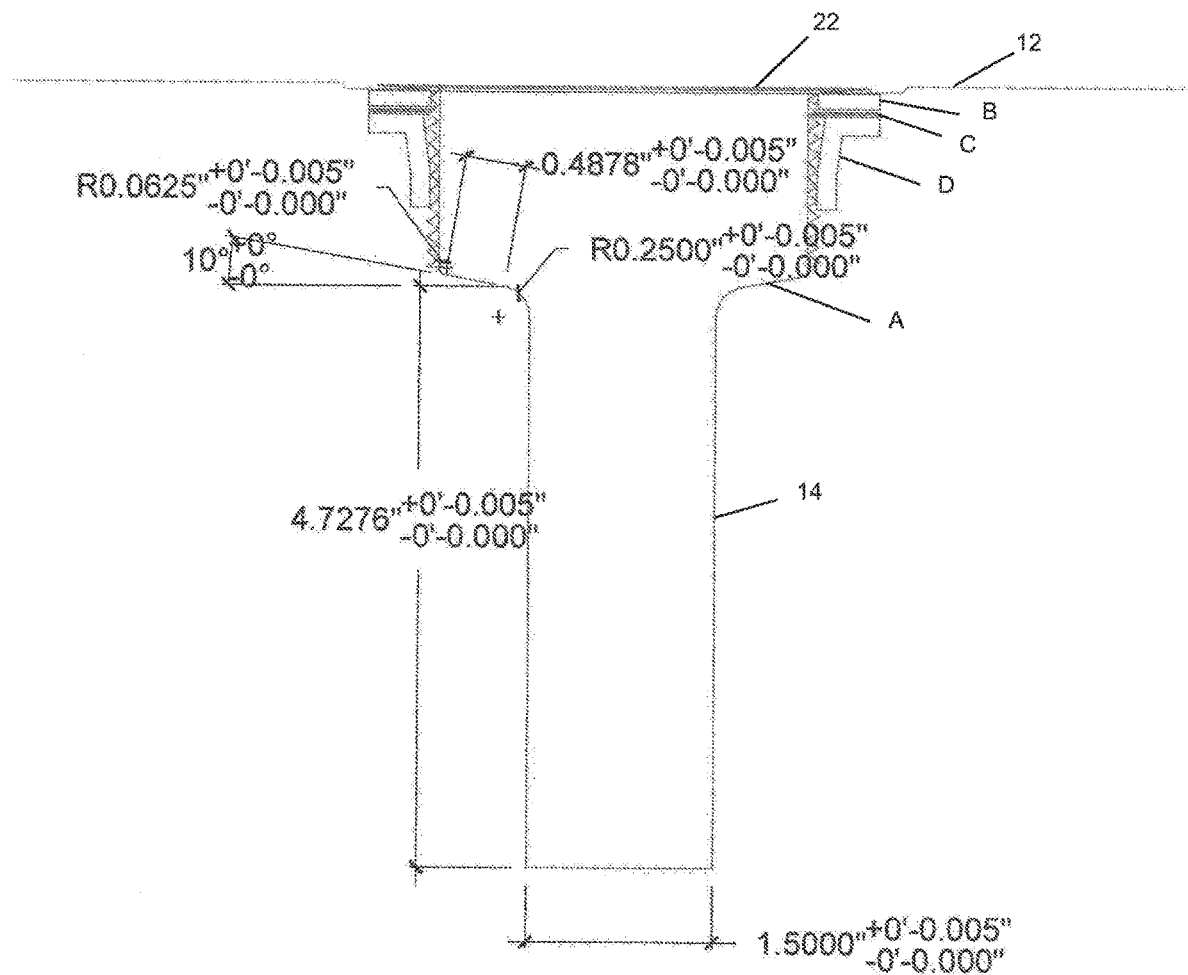
FIG. 2 is a cross-sectional view of a drain basket for use with a pipe coupling assembly according to an embodiment of the invention.

Referring now to FIG. 2, sink basin 12 is coupled with drain system 10 by a drain basket A that includes an extended pipe neck portion 14 adapted to be received within a socket G for coupling drain basket A with a drain pipe F (FIG. 1A). A rubber gasket B fits against a bottom of sink basin 12 and around drain basket A. An optional cardboard gasket C and/or plumber's lube can be provided between rubber gasket B and a drain basket nut D used to force rubber gasket B tight against the bottom of sink basin 12. The drain basket A can include a lip 22 that engages an inner bottom surface of sink basin 12. Plumbers putty or other sealing compound can be applied to lip 22 and sink basket nut D can apply pressure to draw lip 22 against the inner bottom surface of sink basin 12, forming a liquid tight seal and squeezing out the excess plumber's putty. The exact manner in which drain basket A is sealed with sink basin 12 is not germane to the embodiments of the invention and can include fewer or additional components without deviating from the scope of the invention. As is understood by one of ordinary skill in the art, the dimensions provided in FIG. 2 are exemplary dimensions only and can vary based on intended use and the size of the components to which drain basket A is to be coupled. Any one or more of the dimensions provided in FIG. 2 can be varied as desired for suitability with coupling to an adjacent component, such as sink basin 12 or coupling assembly 20 (FIG. 1A-1E). The exemplary dimensions of FIG. 2 are not limiting, but rather intended to provide just one of many possible examples.

Figure 3A:
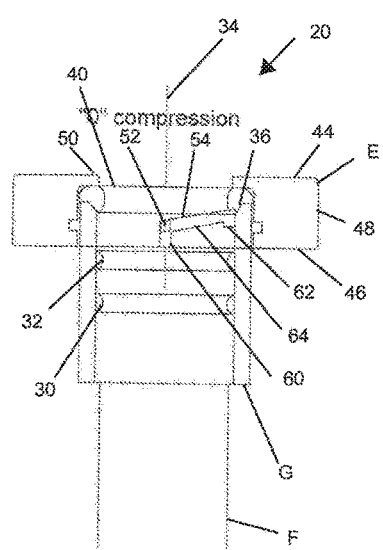
FIG. 3A are cross-sectional views of a portion of a pipe coupling assembly according to an embodiment of the invention.
Figure 3B:
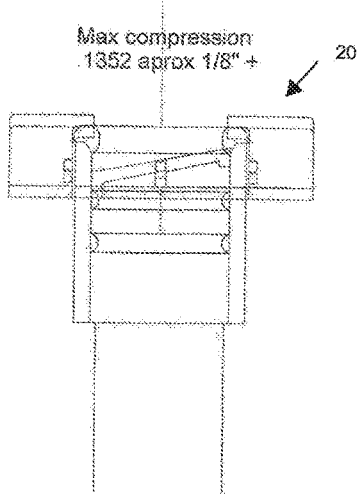
FIG. 3B is a cross-sectional view of a portion of a pipe coupling assembly according to an embodiment of the invention.
Figure 3C:
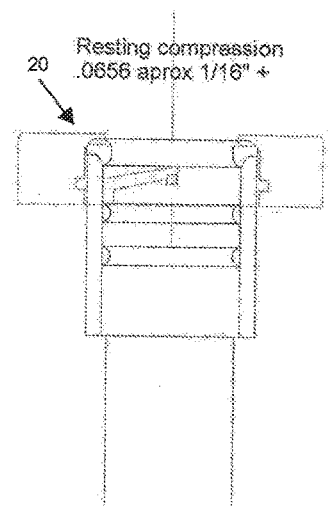
FIG. 3C is a cross-sectional view of a portion of a pipe coupling assembly according to an embodiment of the invention.

With reference to FIGS. 3A-3C, drain basket A (FIG. 1A) is coupled with drain pipe F by coupling assembly 20, which includes a locking ring E and a socket G. Socket G is formed in an end portion of drain pipe F, or any other pipe, for coupling to an end portion of an adjacent pipe. Socket G includes at least two sealing surfaces 30, 32 on an interior surface of socket G. Sealing surfaces 30, 32 are spaced along a longitudinal axis 34 of socket G. While socket G is illustrated with two sealing surfaces 30, 32, it is within the scope of the invention for socket G to include additional sealing surfaces arranged parallel with, but spaced from, sealing surfaces 30, 32.

Socket G includes a rim 36 defining an opening into an interior of socket G through which neck portion 14 (FIGS. 1A and 2) is inserted. A rim sealing surface 40 is provided on rim 36 for forming a liquid-tight seal between socket G and inserted neck portion 14. Socket rim 36 includes an angled surface that is angled inward to the interior of socket G that supports rim sealing surface 40.

Sealing surfaces 30, 32 and rim sealing surface 40, together form pipe coupling sealing surfaces K (FIGS. 7A-7B and 8A-8B), can be the same or different. Thus, sealing surfaces 30, 32 form first and second lines of defense against leaks, and the rim sealing surface 40 provides a third line of defense against leaks. In addition, sealing surfaces 30, 32 hold the inserted tube parallel to the coupler as well as absorb shock due to bumps or impacts without losing the water tight seal.

In one example, sealing surfaces 30, 32 and rim sealing surface 40 are in the form of silicone gaskets. The interior surface of socket G can optionally be provided with grooves adapted to support each of the sealing surfaces 30, 32. The sealing surfaces 30, 32 and rim sealing surface 40 can optionally be bonded with the adjacent surface using an adhesive or a melt weld. In one example, sealing surfaces 30, 32 and rim sealing surface 40 are molded gaskets, such as injection molded silicone gaskets. The molded gaskets are optionally embedded within a recess formed in the corresponding supporting part.

For example, socket G can be made from a suitable polymeric material, such as polyvinylchloride, through an injection molding process, and silicone gaskets 30, 32, and 40 are formed during a separate injection molding process to bond the silicone gaskets 30, 32, and 40 to the adjacent surfaces of socket G (or snapped into place as noted). Silicone is selected as an exemplary material for the sealing surfaces 30, 32, and 40 due at least in part to its elastomeric and stress relaxation characteristics. Silicone-based materials can also be relatively resistant to heat compared to other elastomers and can generally provide acceptable or better sealing pressure when used with the coupling assembly 20.

As best seen in FIG. 3A, locking ring E includes a first end 44, a second end 46, and a body portion 48 extending between first and second ends 44, 46. First end 44 includes a flange 50 that extends inward toward a center of the locking ring E. Second end 46 is configured to receive socket G to allow locking ring E to be placed over the end of socket G. Flange 50 defines an opening in the first end 44 of locking ring E that is dimensioned so as to allow neck portion 14 of drain basket A to be inserted through locking ring E and into socket G.

Socket G includes a first locking element 52 that is configured to mate with a second locking element 54 formed on the locking ring E. As illustrated in FIG. 1A, in one embodiment, first locking element 52 is in the form of a plurality of projections 52 extending from an exterior surface of socket G and spaced about a circumference of socket G. With reference to FIGS. 3A-3C, second locking element 54 is in the form of channels formed in an interior surface of body portion 48 of locking ring E. Projections 52 and channels 54 are configured such that projections 52 travel along channels 54 as locking ring E is rotated relative to socket G, drawing flange 50 toward socket rim 36, thereby compressing rim sealing surface 40 between flange 50 and socket rim 36. When an end portion of a pipe, such as neck portion 14 of drain basket A, is located within socket G, compression of rim sealing surface 40 between flange 50 and socket rim 36 can form a liquid-tight seal between socket G and the inserted pipe end portion.

In the embodiment illustrated in FIGS. 3A-3C, channels 54 include a channel inlet 60 connected with a channel end portion 62 by a channel neck portion 64. Channel neck portion 64 extends at an angle between channel inlet 60 and end portion 62 to facilitate drawing flange 50 and socket rim 36 together as locking ring E is rotated relative to socket G. Channel neck portion 64 has a length and an angle with respect to rim 36 selected to provide the desired amount of compression on rim sealing surface 40 when locking ring E is rotated. The dimensions and location of channels 54 and projections 52 is selected based on a desired amount of rotation of locking ring E that provides a desired amount of sealing surface compression and/or torque. For example, channel neck portion 64 can be formed at an angle of approximately 9 to 12 degrees with respect to the rim 36 and have a length such that a predetermined amount of rotation of locking ring E provides the desired amount of compression on rim sealing surface 40. In one example, channel neck portion 64 is formed at a 9-12 degree angle and has a length such that rotation of locking ring E about approximately a 1.4043 inch arc, which corresponds to a little less than a ¼ turn, provides the desired amount of compression on rim sealing surface 40. It will be understood that the length and/or angle of channel neck portion 64 may be selected to allow locking ring E to be turned any desired amount, non-limiting examples of which include a ½ turn, a ¾ turn, a full rotation, and any multiples of a partial or complete turn, to provide the desired amount of compression.

Projections 52 include upper and lower camming surfaces provided at an angle corresponding to the angle of channel neck portion 64 to facilitate travel of projections 52 within channel 54. Projections 52 are spaced as desired about the circumference of socket G, and in the illustrated embodiment are equally spaced about the circumference to facilitate evenly compressing rim sealing surface 40 as locking ring E is rotated.

Projections 52, channels 54, and rim sealing surface 40 are adapted to provide a predetermined amount of compression of rim sealing surface 40 when locking ring E is moved from the unlocked condition of FIG. 3A to the locked condition of FIG. 3C. As illustrated in FIG. 3A, when locking ring E is placed on socket G, with projections 52 aligned with channel inlet 60, there is essentially no compression ("0" compression) of rim sealing surface 40 by flange 50. As locking ring E is rotated and projections 52 travel along the channel neck portion 64 to end portion 62, locking ring E and socket G are drawn together and flange 50 applies pressure to rim sealing surface 40 to compress rim sealing surface 40 (FIG. 3B), optionally to its maximum compression before the locking ring is moved or seated in its locked position. Once locking ring E is moved to its locked position, the compression rim sealing surface is then compressed to a "resting" compression as shown in FIG. 3C, which is less than its maximum compression. Compression of rim sealing surface 40 facilitates forming a liquid-tight seal around a pipe end portion inserted within socket G. Forming rim 36 with a surface angled inward toward the interior of socket G facilitates directing compressed rim sealing surface 40 against the inserted pipe end portion to form the liquid-tight seal.

The components of socket G and locking ring E are selected to provide the desired amount of sealing surface compression based on the intended use of pipe coupling assembly 20. The dimensions of projections 52, channels 54, rim sealing surface 40, and neck portion 14 are selected to provide the desired amount of sealing surface compression when locking ring E is in the locked condition. The dimensions of neck portion 14, socket G, and socket sealing surfaces 30, 32 can also be selected to provide the desired amount of sealing surface compression when neck portion 14 is inserted into socket G to form a liquid-tight seal. In addition, the materials forming rim sealing surface 40 and socket sealing surfaces 30, 32 are selected based on the amount of compression desired when socket G and neck portion 14 are coupled.

Figure 4:
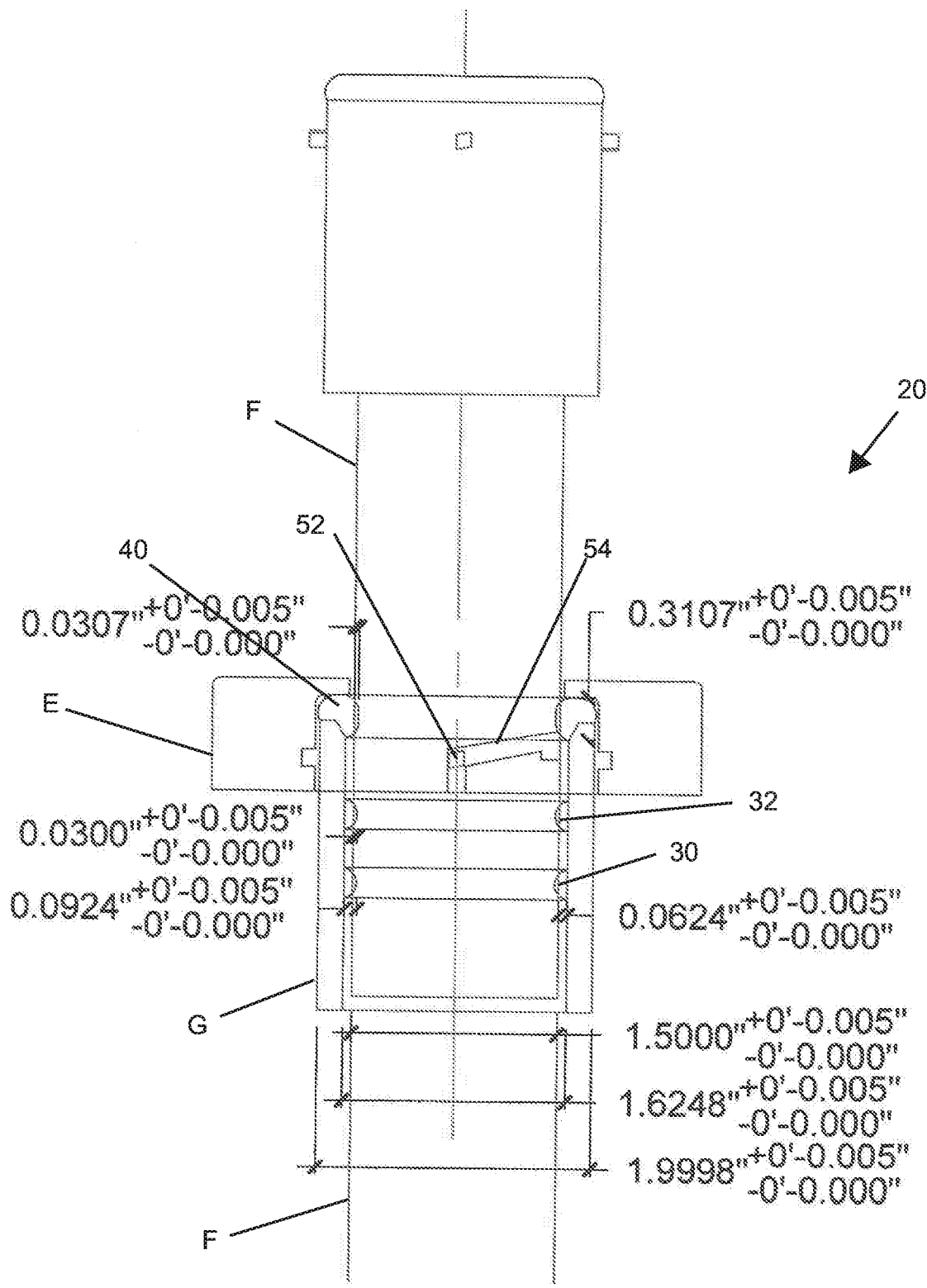
FIG. 4 is a cross-sectional view of a portion of a pipe coupling assembly according to an embodiment of the invention.
Figure 5:
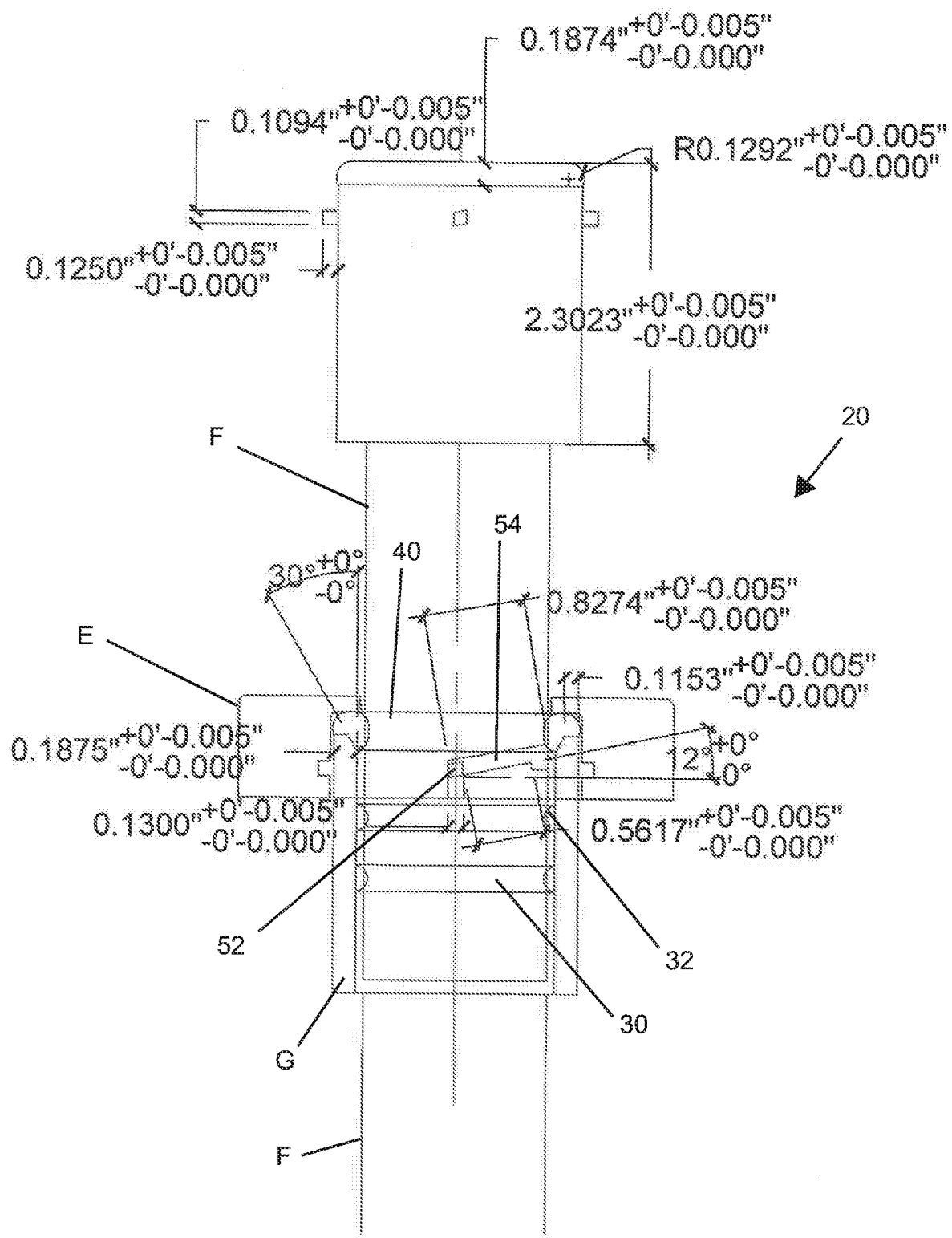
FIG. 5 is a cross-sectional view of a portion of a pipe coupling assembly according to an embodiment of the invention.

With reference to FIGS. 4 and 5, example dimensions according to one embodiment in a low-pressure system, such as an under-sink drain system, for forming a liquid-tight seal are illustrated. In this example, rim sealing surface 40 has a radial thickness of about 0.2945 inches when not compressed and is compressed to about 0.2638 inches when neck portion 14 is inserted into socket G, resulting in a compression of about 0.0370 inches in radial thickness of rim sealing surface 40. When locking ring E is moved to the locked position, rim sealing surface 40 is compressed axially about 0.0656 inches (approximately 1/16 inch). The combination of radial and axial compression of rim sealing surface 40 against neck portion 14 contributes to forming the liquid-tight seal around neck portion 14. In this example, socket sealing surfaces 30, 32 have a radial thickness of about 0.0924 inches before neck portion 14 is inserted into socket G. When neck portion is fully inserted into socket G, neck portion 14 compresses the radial thickness of socket sealing surfaces 30, 32 to about 0.0624 inches, resulting in a radial compression of about 0.0300 inches. As used herein, compression of sealing surfaces 30, 32, and 40 is determined by measuring the distance an object traveled in compressing of the sealing surface. It will be understood that neck portion 14, socket G, and locking ring E may be configured to provide different amounts of radial and/or axial compression of rim sealing surface 40 and socket sealing surfaces 30, 32 to provide the desired degree of sealing between socket G and neck portion 14. In another example, the uncompressed and compressed radial and/or axial dimensions of rim sealing surface 40 and socket sealing surfaces 30, 32 differ from the example just described, with the neck portion 14, socket G, and locking ring E configured to provide approximately the same change in radial and/or axial dimensions upon insertion of neck portion 14 into socket G and locking of locking ring E.

FIGS. 4 and 5 illustrate exemplary dimensions for one embodiment of pipe coupling assembly 20. As is understood by one of ordinary skill in the art, the dimensions provided in FIGS. 4 and 5 are exemplary dimensions only and can vary depending on intended use and the size of the components which are being coupled. Any one or more of the dimensions provided in FIGS. 4 and 5 can be varied as desired for suitability with coupling to an adjacent component, non-limiting examples of which include drain basket A, drain pipe F, T-shaped pipe H, liquid trap I, and cross-over pipe J (FIG. 1A-1E). The exemplary dimensions of FIGS. 4 and 5 are not limiting, but rather intended to provide just one of many possible working examples.

While projections 52 are described as being formed by socket G and channels 54 are described as formed in locking ring E, the location of the projections 52 and channels 54 can be reversed such that projections 52 are formed on the interior surface of body portion 48 of locking ring E and channels 54 are formed in the exterior surface of socket G. In the reversed configuration, locking ring E is rotated relative to socket G in the manner described above to draw locking ring E and socket G together to compress rim sealing surface 40.

Figure 6:
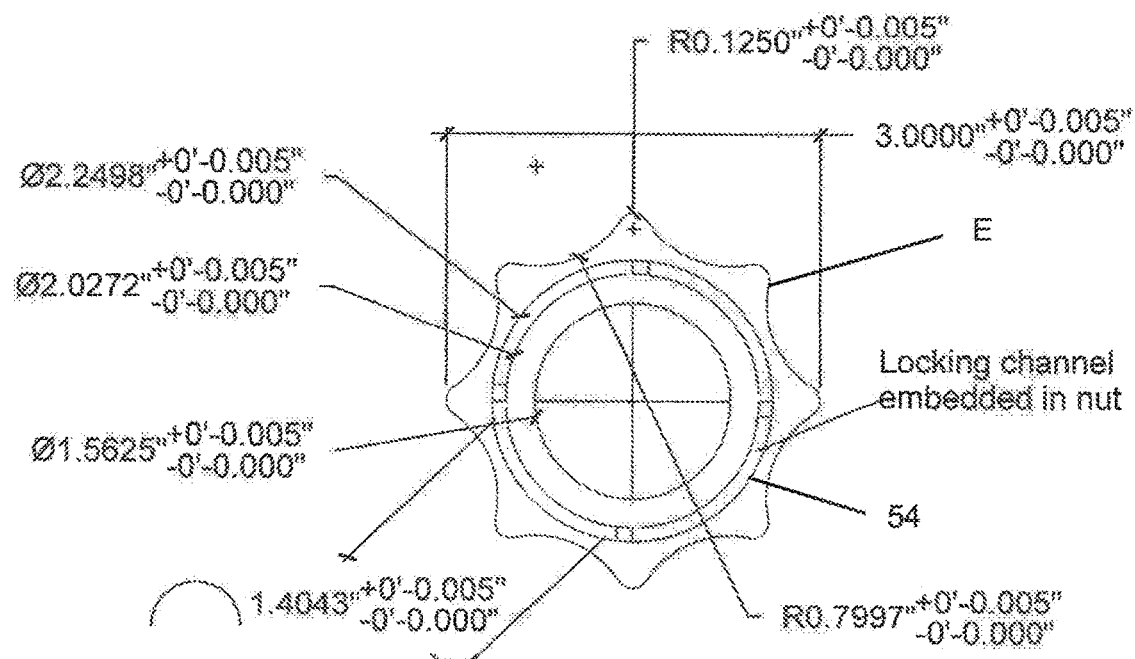
FIG. 6 is a top plan view of a portion of a pipe coupling assembly according to an embodiment of the invention.
Figure 6A:
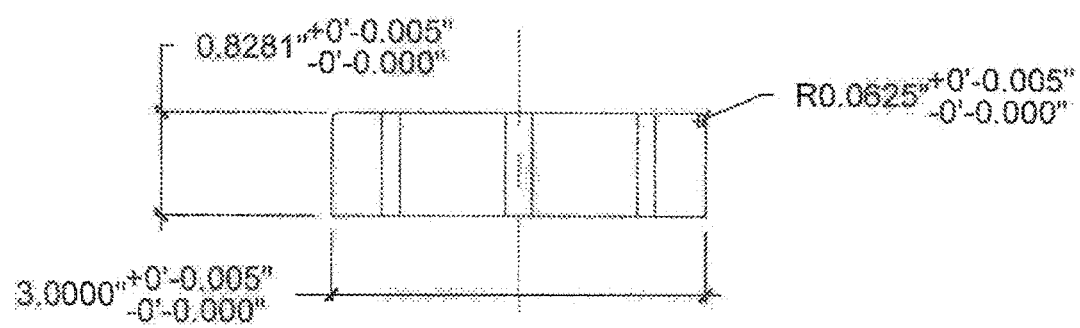
FIG. 6A is a side view of the portion of the pipe coupling assembly of FIG. 6.
Figure 7A:
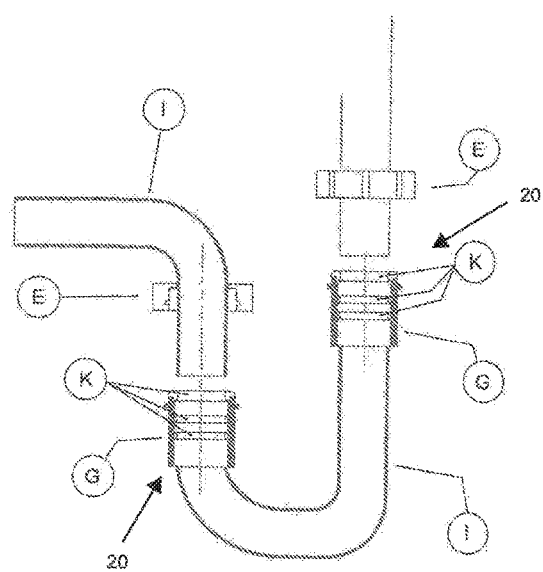
FIG. 7A is a cross-sectional view of a pipe coupling assembly according to an embodiment of the invention.
Figure 7B:
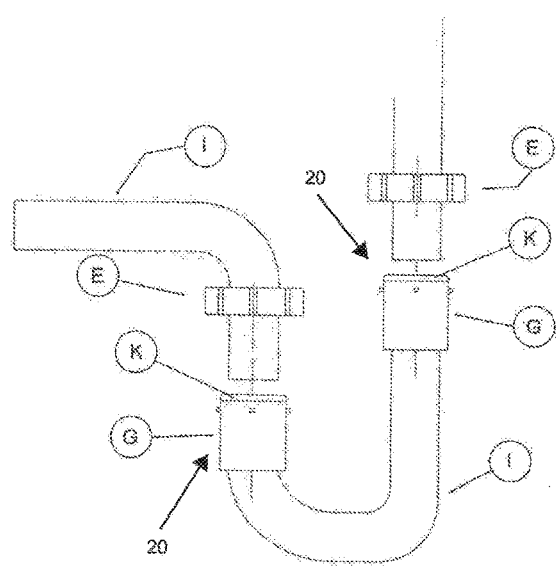
FIG. 7B is a side view of a pipe coupling assembly according to an embodiment of the invention.

Referring now to FIG. 6, locking ring E can have any desired cross-sectional shape. In one embodiment, locking ring E includes multiple rounded corners to facilitate grasping locking ring E and rotating locking ring E. As is understood by one of ordinary skill in the art, the dimensions provided in FIG. 6 are exemplary dimensions only and can vary depending on intended use and the size of the components with which locking ring E is being used. Any one or more of the dimensions provided in FIG. 6 can be varied as desired for suitability with coupling a pipe end portion, such as drain pipe F or neck portion 14, with socket G (FIGS. 1A-1E). The exemplary dimensions of FIG. 6 are not limiting, but rather intended to provide just one of many possible examples.

As illustrated in FIGS. 1A-1E and FIGS. 7A-B and 8A-B, pipe coupling assembly 20 can be used on any type of pipe, non-limiting examples of which include liquid trap I (FIGS. 7A-B), a T-shaped pipe L (FIGS. 8A-B), and cross-over pipe J (FIG. 1A). Pipe coupling assembly 20 can be used with any pipe end portion having an uninterrupted exterior surface, i.e. no special features are required on the inserted pipe end portion for use with pipe coupling assembly 20 and thus pipe coupling assembly 20 can essentially be used with any pipe end portion to form a liquid-tight seal. For example, because pipe coupling assembly 20 does not require the inserted pipe portion to have any particular exterior features for coupling, the dimensions of socket G can be configured for use with any existing pipe having an end portion having a straight section long enough to fit within socket G and engage both socket sealing surfaces 30, 32. Socket G and socket sealing surfaces 30, 32 can have dimensions customized to receive a pipe end portion of a particular dimension or dimensions corresponding to commonly used pipe dimensions. For example, the dimensions of socket G and socket sealing surfaces 30, 32 can be configured to seal with pipes typically used in under-sink drain systems. Pipe coupling assembly 20 also facilitates designing kits for sale that are interchangeable. Regardless of what type of connecting pipe is being used—drain basket, T-shaped, liquid trap, etc. . . . —as long as the connecting pipe includes an end portion having a straight section with dimensions configured to be received within socket G and compress socket sealing surfaces 30, 32 and to seal with rim sealing surface 40 when locking ring E is in the locked position, pipe coupling assembly 20 can be used.

The multiple socket sealing surfaces 30, 32 inside socket G facilitate holding the inserted pipe end portion parallel within socket G and also create multiple seals within socket G that contribute to forming a liquid-tight seal. Compression of rim sealing surface 40 forms a third seal around the inserted pipe end portion, further contributing to formation of a liquid-tight seal. The multiple socket sealing surfaces 30, 32 help to hold and stabilize the inserted pipe end portion relative to socket G, which can contribute to forming the liquid-tight seal. The design of pipe coupling assembly 20 is easy to use and incorporate across multiple different types of pipe configurations. In addition, locking ring E, which is designed to provide the correct amount of sealing compression to rim sealing surface 40, makes pipe coupling assembly 20 "user-friendly" for consumers. Locking ring E removes the guess-work for consumers compared to other systems that utilize a traditional threaded nut for tightening the connection in which it is unclear whether the nut has been tightened enough or not enough. Locking ring E is configured to provide the correct amount of sealing surface compression when rotated into the locked condition.

Figure 9:
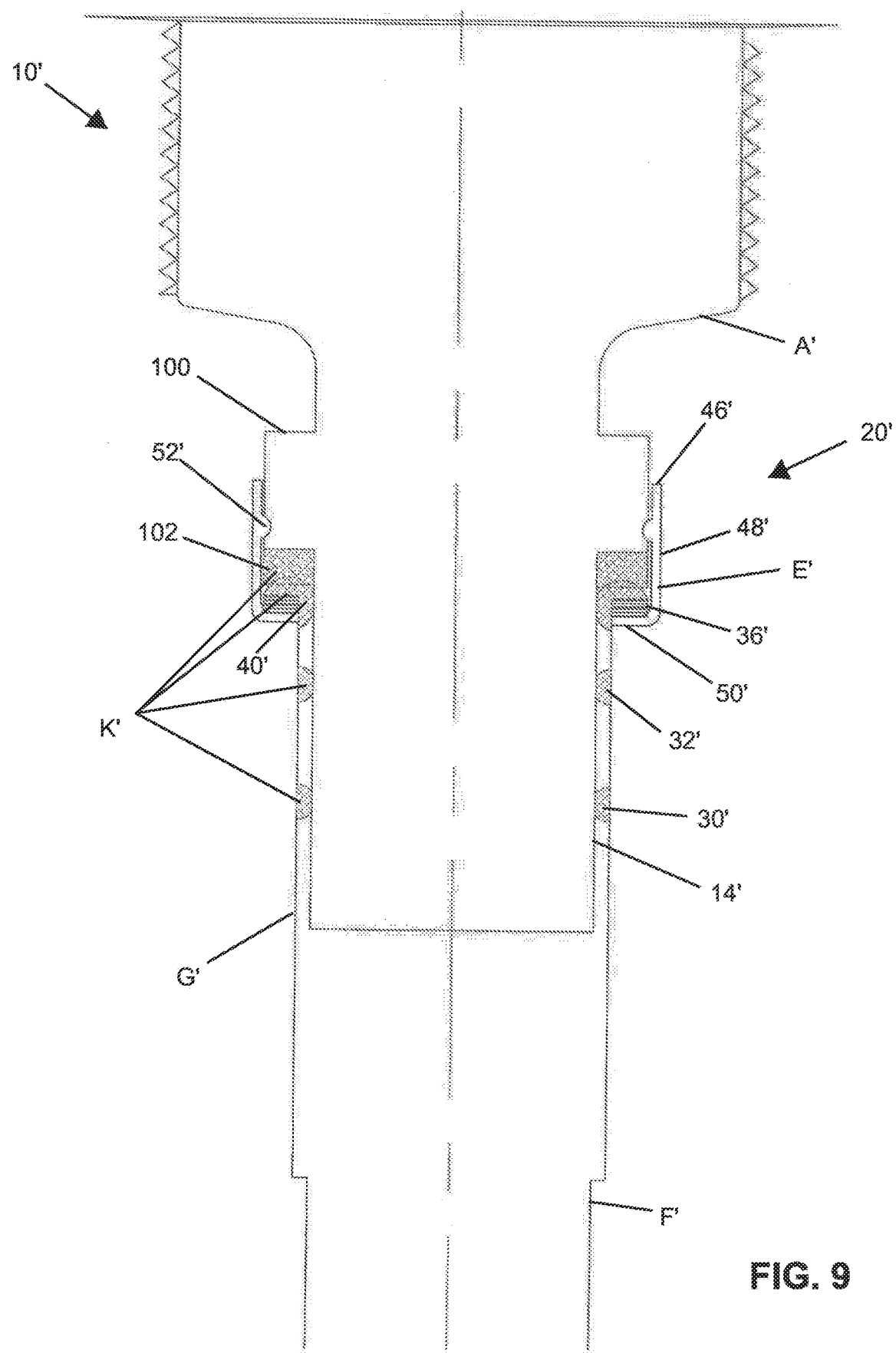
FIG. 9 is a cross-sectional view of a drain system and pipe coupling assembly according to an embodiment of the invention.
Figure 10:
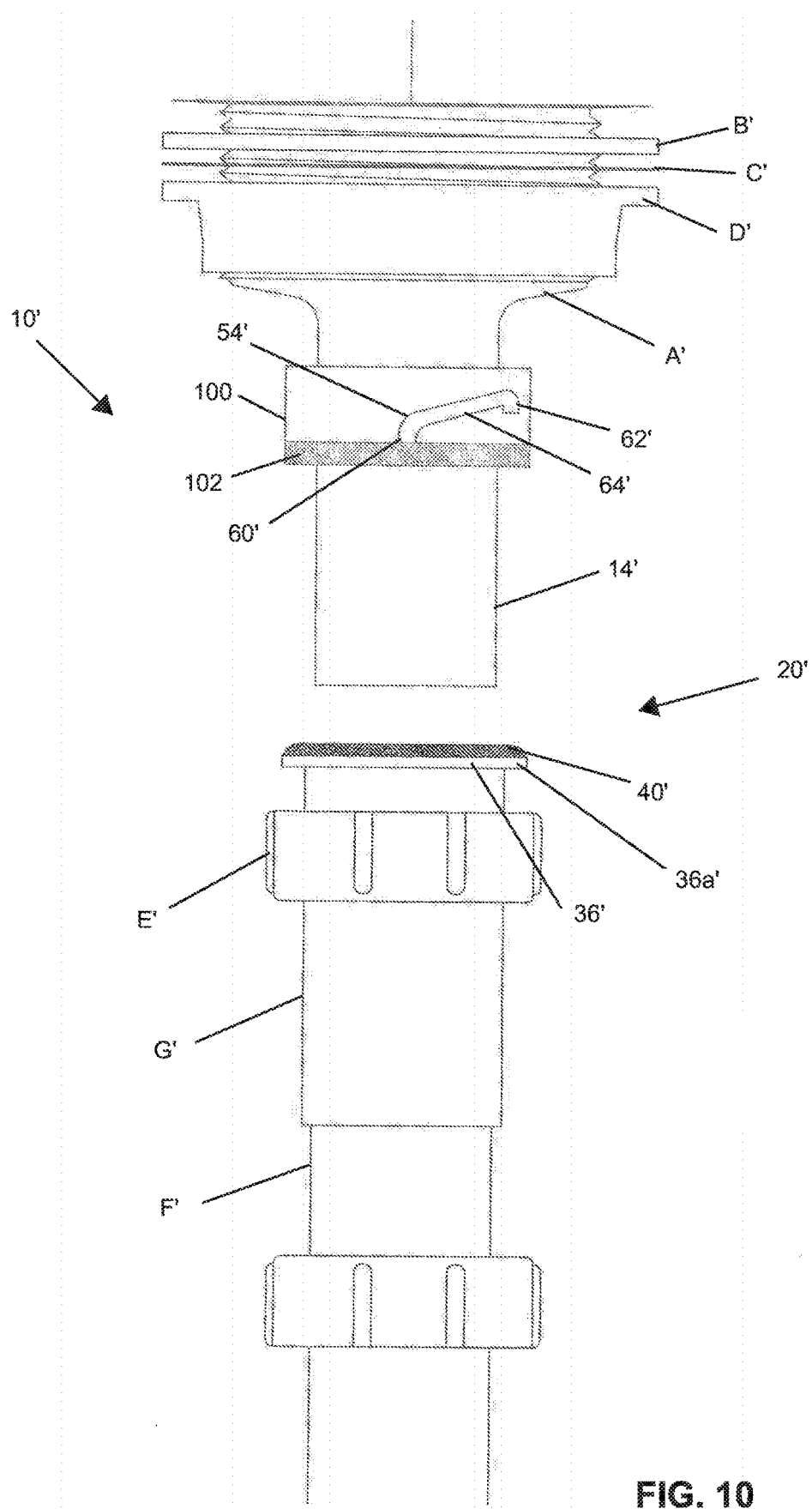
FIG. 10 is a side view of a drain system and pipe coupling assembly according to an embodiment of the invention.

Referring to FIGS. 9-10, another embodiment of a pipe coupling assembly 20' is illustrated that is similar to pipe coupling assembly 20 in many respects. Those parts of drain system 10' and pipe coupling assembly 20' similar to those of drain system 10 and pipe coupling assembly 20 of FIG. 1A are labeled with a prime suffix.

Drain basket A' is coupled with sink basin 12 in the same manner as described above with respect to FIG. 1A. Neck portion 14' of drain basket A' includes a shoulder 100 having a channel 54' (FIG. 10) formed therein. Drain basket A' is coupled with drain pipe F' by pipe coupling assembly 20' through shoulder 100.

With reference to FIG. 9, neck portion 14' of drain basket A' is configured to be inserted through locking ring E' into socket G'. Socket G' includes at least two sealing surfaces 30', 32' for forming a liquid-tight seal with neck portion 14' in a manner similar to that described above for coupling assembly 20 of FIG. 1A. Neck portion 14' is inserted into socket G' and locking shoulder 100 is moved toward socket rim 36'. Socket rim 36' includes a sealing surface 40' which seals against shoulder 100 to form an additional liquid-tight seal. Shoulder 100 can optionally include a sealing surface 102 that forms a liquid-tight seal with sealing surface 40, as shown. Alternatively, the shoulder 100 does not include a separate sealing surface and forms a seal directly against the rim sealing surface 40'. Socket rim 36' includes a flange portion 36a' that projects outward, away from the interior of socket G', and is adapted to be engaged by flange 50' on locking ring E'.

Referring now to FIG. 10, shoulder 100 includes a channel 54' configured to receive a projection 52' on locking ring E'. Projection 52' (FIG. 9) is configured to travel along channel 54' from channel inlet 60', corresponding to an unlocked condition, along channel neck portion 64' to channel end portion 62', which corresponds to a locked condition. The dimensions of locking ring E' and drain pipe F' are configured such that locking ring E' is slid onto drain pipe F' over the end portion opposite socket G' until flange 50' engages socket rim 36'. Projections 52' on locking ring E' are aligned with channel inlet 60' on shoulder 100 and neck portion 14' of drain basket A' is inserted into socket G'. Rotation of locking ring E' causes projection 52' to travel along channel neck portion 64' to channel end portion 62', which draws shoulder 100 and socket G' toward one another. The number and spacing of projections 52' and channels 54' can be any desired number and spacing. In one example, coupling assembly 20' includes two equally spaced projections 52' configured to mate with two channels 54'.

When projections 52' reach channel end portion 62', shoulder 100 and socket G' have been drawn toward one another to form a liquid-tight seal between shoulder 100 and socket G'. A length and/or angle of channel 54' is selected to provide the desired amount of compression of the sealing surfaces between shoulder 100 and socket G' to form the liquid-tight seal. In the example illustrated in FIGS. 9 and 10, shoulder 100 includes shoulder sealing surface 102 that engages and compresses against rim sealing surface 40' when locking ring E' is moved into the locked condition. However, only one of shoulder 100 and socket G' can include sealing surface 102 or 40', respectively, for compressing against and sealing with the other of shoulder 100 and socket G'. The materials used for shoulder sealing surface 102 and rim sealing surface 40' are selected to provide the desired amount of compression when locking ring E' is in the locked condition. The shoulder sealing surface 102 and rim sealing surface 40' are formed from the same or different materials and can be configured to compress to the same or different degree.

As described above, neck portion 14' of drain basket A' has an extended length to form a surface for sealing with socket sealing surfaces 30', 32'. The dimensions of socket G', socket sealing surfaces 30', 32', and neck portion 14' are configured to provide a predetermined amount of compression when neck portion 14' is inserted into socket G'. Socket sealing surfaces 30, 32', rim sealing surface 40', and shoulder sealing surface 102, when present, act together to form pipe sealing surfaces K'. One or more of pipe sealing surfaces K' can be the same or different. The interior surface of socket G' can optionally be provided with grooves adapted to support each of the sealing surfaces 30', 32'. Sealing surfaces 30', 32', rim sealing surface 40', and/or shoulder sealing surface 102 can optionally be bonded with the adjacent surface using an adhesive or a weld. In one example, sealing surfaces 30', 32', rim sealing surface 40', and/or shoulder sealing surface 102 are molded gaskets, such as injection molded silicone gaskets. In another example sealing surfaces 30', 32', 40', and/or 102 are at least partially embedded within a recess formed in the supporting part and are optionally bonded to at least one surface within the recess. For example, sealing surfaces 30', 32', 40', and/or 102 can be injection molded within a recess formed in the supporting part such that sealing surfaces 30', 32', 40', and/or 102 are embedded, molded gaskets. In another example, while sealing surfaces 30', 32' and rim sealing surface 40' are formed from embedded and/or bonded silicone gaskets, shoulder sealing surface 102 is in the form of an embedded and/or adhered semi-firm rubber gasket.

Figure 11:
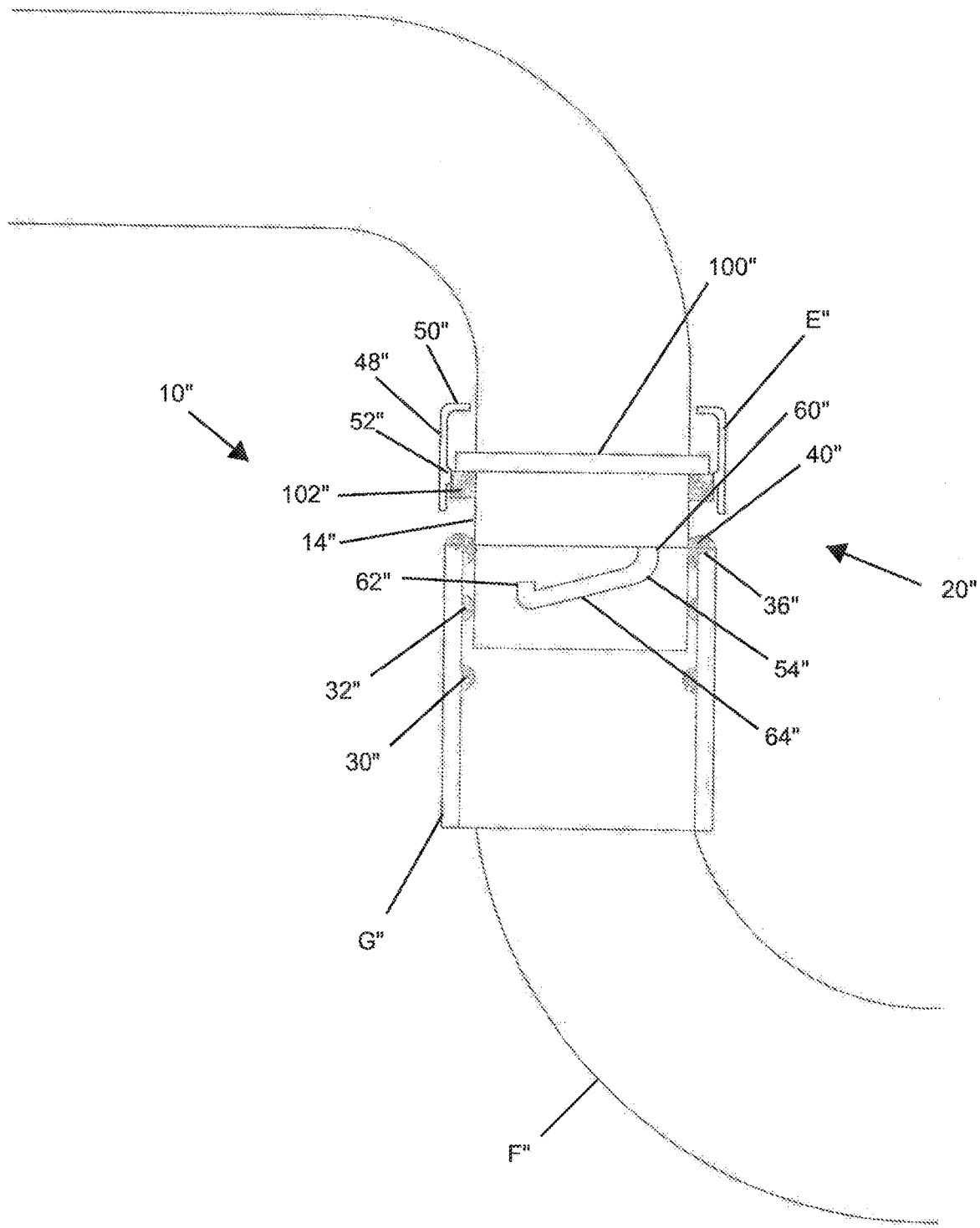
FIG. 11 is a cross-sectional view of a pipe coupling assembly according to an embodiment of the invention.

Referring now to FIG. 11, another embodiment of a pipe coupling assembly 20'' that is similar to pipe coupling assembly 20 and 20' in many respects is illustrated. Those parts of drain system 10'' and pipe coupling assembly 20'' similar to those of drain system 10, 10' and pipe coupling assembly 20, 20' of FIGS. 1A-1E and 9, respectively, are labeled with a double prime suffix.

Referring to FIG. 11, socket G'' is similar to socket G of FIG. 1A and includes 3 sealing surfaces, for example, rim sealing surface 40'' and two sealing surfaces 30'', 32''. Socket G'' also includes channel 54'' which is configured to mate with locking ring E'' to couple end portion 14'' of connecting pipe with socket G''. End portion 14'' of the connecting pipe includes a shoulder 100'' which seals with rim sealing surface 40''. Locking ring E'' includes a plurality of projections 52'' that engage channels 54'' in socket G'' to draw end portion 14'' and socket G'' together as locking ring E'' is rotated into the locked condition. Locking ring flange 50'' engages shoulder 100'' to draw end portion 14'' toward socket G'' as locking ring E'' is rotated to the locked condition. Shoulder 100'' optionally includes a sealing surface 102'' for compressing against and sealing with rim sealing surface 40'' in a manner similar to that described above for pipe coupling assembly 20'.

Referring now to FIG. 12, the numeral 120 designates yet another embodiment of a coupling assembly. Similar to coupling assembly 20, coupling assembly 120 may include a locking ring 122 and a pipe socket 124, similar to locking ring E and socket G described above. Socket 124 is formed on an end portion of drain pipe F, or any other pipe, for coupling to an end portion of an adjacent pipe, such as pipe neck portion 14. Socket 124 includes at least two annular sealing surfaces 130, 132 on an interior surface 126 of socket 124. In the illustrated embodiment, sealing surfaces 130 and 132 are mechanically coupled to interior surface 126 of socket 124, for example, with a snap-fit coupling. Similar to sealing surfaces 30, 32, sealing surfaces 130, 132 are spaced along a longitudinal axis 134 of socket 124 so that they can provide assistance with keeping tube F aligned in socket 124, as noted below. While socket 124 is illustrated with two sealing surfaces 130, 132, it is within the scope of the invention for socket 124 to include additional sealing surfaces arranged parallel with, but spaced from, sealing surfaces 130, 132.

Figure 13:
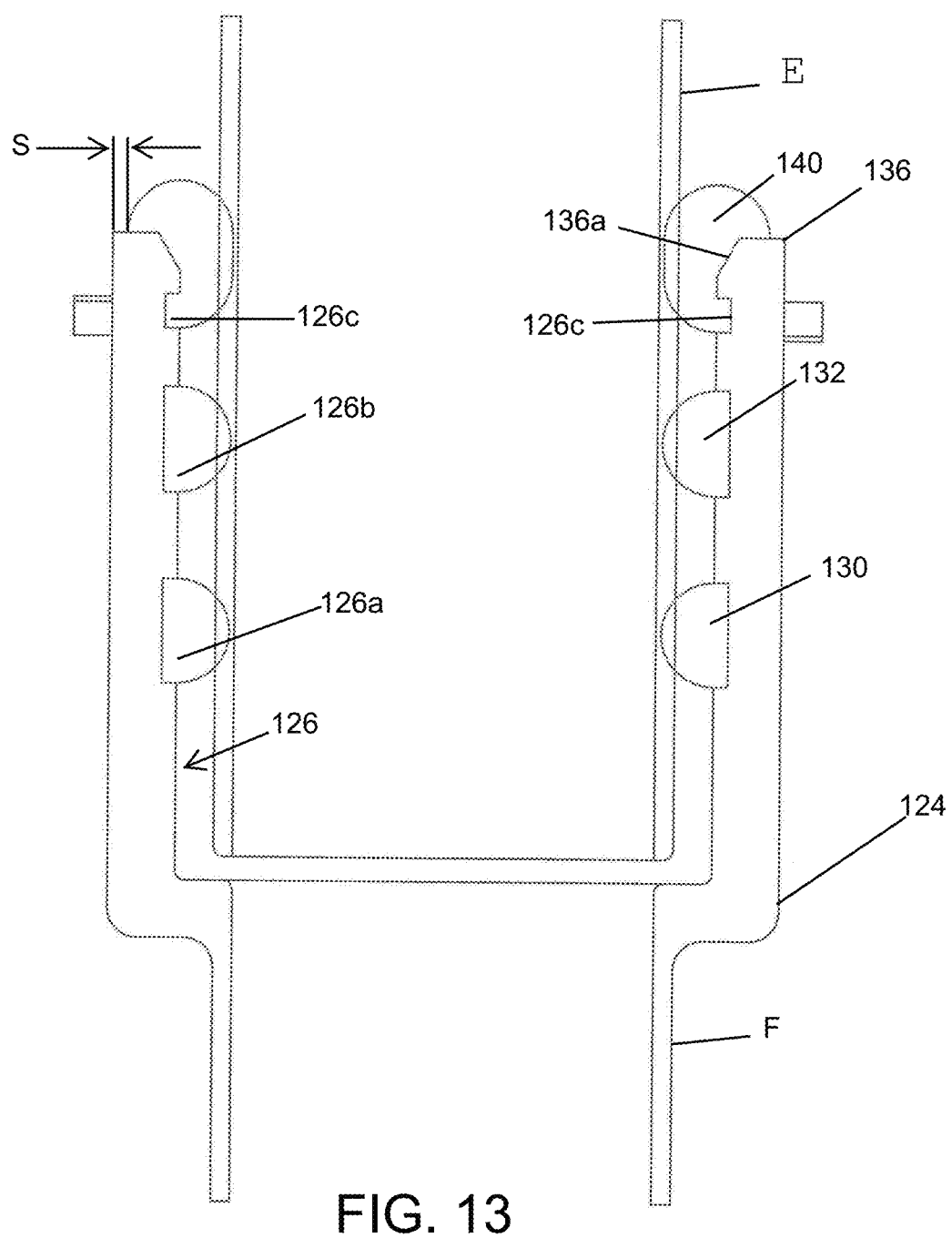
FIG. 13 is a similar view to FIG. 12 but with the locking ring removed.

Referring to FIG. 13, socket 124 includes a rim 136 defining an opening into the interior of socket 124 through which a pipe, such as pipe neck portion 14 of a drain basket (FIGS. 1A and 2) may be inserted. An annular rim sealing surface 140 is provided on rim 136 for forming a liquid-tight seal between socket 124, locking ring 122, and inserted neck portion 14. Socket rim 136 includes an angled surface 136a that is angled inward to the interior of socket 124 that supports rim sealing surface 140. Further, as will be more fully described below, rim sealing surface 140 is also mechanically coupled to interior surface 126 of socket 124.

In addition, socket 124 includes a radiused transition 124a between its respective pipe, such as pipe F, to which coupling assembly 120 couples the first pipe (e.g. pipe neck portion 14). Radiused transition 124a optionally includes radiused corners at the transitions between the thicker wall portion of socket 124 and the pipe (e.g. pipe F) to reduce the stresses, for example, during manufacturing, installation, and/or use.

Sealing surfaces 130, 132 and rim sealing surface 140 together may form pipe coupling sealing surfaces, such as pipe coupling sealing K shown in FIGS. 7A-7B and 8A-8B.

In one example, sealing surfaces 130, 132 and rim sealing surface 140 are formed from any suitable rubber material that is capable of withstanding harsh chemicals of drain cleaners, while still providing a sealing surface. For example, suitable rubbers include neoprene rubber.

In the illustrated embodiment, interior surface 126 of socket 124 is provided with annular recesses or grooves 126a, 126b, 126c adapted to support and contain at least a portion of each of the sealing surfaces 130, 132, and 140. As noted, sealing surfaces 130, 132, and sealing surface 140 may form a snap-fit coupling with socket in recesses 126a, 126b, and 126c. The gasket sealing surfaces 130, 132 and rim sealing surface 140 can optionally alternatively or in addition be bonded with the interior surface 126 in grooves 126a, 126b, and 126c using an adhesive or a weld or via molding as described below.

In one example, sealing surfaces 130, 132 and rim sealing surface 140 are molded, such as by silicone injection molding.

Further, sealing surfaces are optionally molded with the interior surface of socket 124 using two shot molding so that the respective sealing surfaces are integrally formed with the interior surface 126 of socket 124.

For example, socket 124 can be made from a suitable polymeric material, such as polyvinylchloride, through an injection molding process, and sealing surfaces 130, 132, and 140 may be formed during a separate injection molding process to bond the sealing surfaces 130, 132, and 140 to the surfaces of socket 124.

In one embodiment, sealing surfaces 130, 132, and 140 are formed from silicone or silicone-based material due at least in part to its elastomeric and stress relaxation characteristics. Silicone-based materials can also be relatively resistant to heat compared to other elastomers and can generally provide acceptable or better sealing pressure when used with the coupling assembly 120.

In one embodiment, sealing surfaces 130, 132, and/or 140 are formed from a material, such as neoprene, such that they may form a snap fit coupling with their respective grooves 126a, 126b, and/or 126c.

Referring again to FIG. 12, locking ring 122 includes a first end 144, a second end 146, and a body portion 148 that extends between first and second ends 144, 146. First end 144 includes a flange 150 that extends radially inward toward a center of the locking ring 122. Second end 146 is configured to receive socket 124 to allow locking ring 122 to be placed over the end of socket 124. Further, inwardly facing surface 152 of ring 122 may include a sealing surface 154, which is optionally mounted to inwardly facing surface 152 of ring 122, for example, in an annular groove 152a so that sealing surface 154 is also mechanically coupled to coupling assembly 120.

Flange 150 of locking ring 122 defines an opening in the first end 144 of locking ring 122 that is dimensioned so as to allow neck portion 14 of drain basket A to be inserted through locking ring 122 and into socket 124.

Socket 124 and locking ring 122 may include locking elements, such as locking elements 52 and 54 described above, so that when locking ring 122 is rotated relative to socket 124, the locking elements draw flange 150 toward socket rim 136, thereby compressing rim sealing surface 140 between flange 150 and socket rim 136. When an end portion of a pipe, such as neck portion 14 of drain basket A, is located within socket 124, compression of rim sealing surface 140 between flange 150 and socket rim 136 can form a liquid-tight seal between socket 124 and the inserted pipe end portion.

The components of socket 124 and locking ring 122 are selected to provide the desired amount of sealing surface compression based on the intended use of pipe coupling assembly 120. The dimensions of various locking elements and sealing surfaces (130, 132, and 140) are selected to provide the desired amount of sealing surface compression when locking ring 122 is in the locked condition. The dimensions of neck portion 14, socket 124, and socket sealing surfaces 130, 132 can also be selected to provide the desired amount of sealing surface compression when neck portion 14 is inserted into socket 124 to form a liquid-tight seal. In addition, the materials forming rim sealing surface 140 and sealing surfaces 130, 132 are selected based on the amount of compression desired when socket 124 and neck portion 14 are coupled.

In the illustrated embodiment, rim sealing surface 140 extends below angled surface 136a of rim 136 and couples to interior surface 126, as noted above, via groove 126c, which is also below angled surface 136a. Optionally, rim sealing surface 140 extends only partially across rim 136, which allows for dual compression from the inserted tube F and the locking ring 122. In addition, rim sealing surface 140 may be formed from a softer material than sealing surfaces 130, 132, again to allow for dual compression. Sealing surfaces 130, 132, on the other hand, may be formed from firmer material than sealing surface 140 to help keep pipe F aligned in and parallel with socket 124 and, further, optionally so that they can absorb shock, for example if tube F is knocked or impacted by a person or object.

Figure 14:
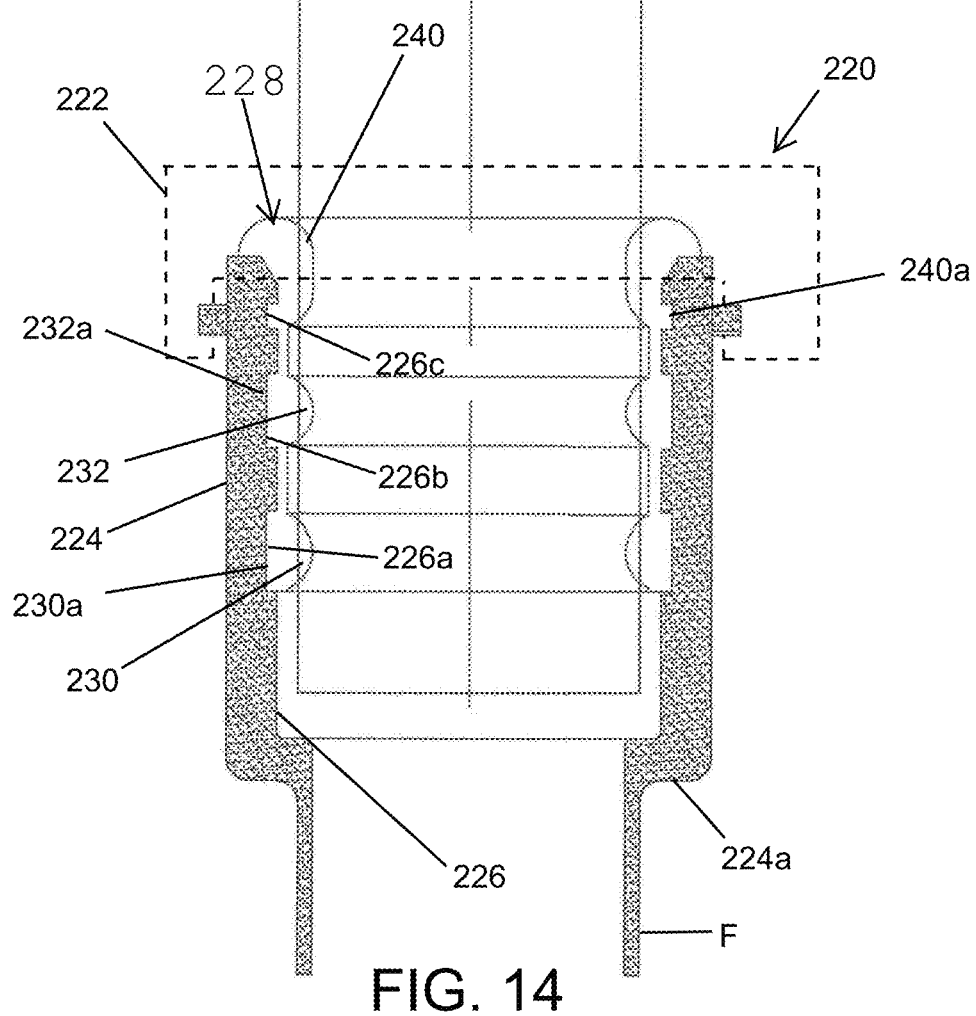
FIG. 14 is a section view of another embodiment of a pipe coupling assembly.

Referring now to FIG. 14, the numeral 220 designates yet another embodiment of a coupling assembly. Similar to coupling assemblies 20 and 120, coupling assembly 220 may include a locking ring 222 (shown only in phantom in FIG. 14) and a pipe socket 224, similar to locking ring 122 and socket 124 described above. Socket 224 is formed in an end portion of a pipe, such as drain pipe F, or any other pipe, for coupling to an end portion of an adjacent pipe.

In the illustrated embodiment, coupling assembly 220 includes a seal assembly 228 that forms one or more pipe sealing surfaces 230, 232 on an interior surface 226 of socket 224. In the illustrated embodiment, seal assembly 228 comprises an annular web or cylindrical sleeve 228a with annular projections on both its interior and exterior surfaces. Although described as annular, at least the projections on the exterior may be radially spaced discrete projections. The projections on the interior surface form annular sealing surfaces 230 and 232, while the projections 230a, 232a on the exterior surfaces form engagement structures to mount the sealing assembly to socket 224. Similar to sealing surfaces 30, 32, 130, 132, pipe sealing surfaces 230, 232 are spaced along the longitudinal axis of socket 224 so that they too can provide assistance with keeping tube F aligned in socket 224. Further, while socket 224 is illustrated with two sealing surfaces 230, 232, it is within the scope of the invention for socket 224 to include fewer or additional pipe sealing surfaces arranged parallel with, but spaced from, sealing surfaces 230, 232.

Socket 224 also includes a rim 236 defining an opening into an interior of socket 224 through which neck portion 14 (FIGS. 1A and 2) may be inserted. Seal assembly 228 further includes a rim sealing surface 240, which is also formed on web 228a at its upper end so sealing surfaces 230, 232, and 240 are mechanically joined together as a unit. Rim sealing surface 240 is similarly formed by a projection, but an upwardly and outwardly extending projection that forms a recess for receiving therein the upper rim of socket 224 to thereby mechanically couple rim sealing surface 240 to the rim of socket 224.

Sealing surfaces 230, 232, and 240, together may similarly form pipe coupling sealing surfaces, such as pipe coupling sealing K shown in FIGS. 7A-7B and 8A-8B.

In one example, sealing surfaces 230, 232, and 240 are formed from any suitable rubber material that is capable of withstanding harsh chemicals of drain cleaners, while still providing a sealing surface. For example, suitable rubbers include neoprene rubber.

In the illustrated embodiment, similar to the previous embodiment, as noted, interior surface 226 of socket 224 is provided with grooves 226a and 226b adapted to support each of the sealing surfaces 230 and 232. Thus, when projections 230a, 232a, are inserted into grooves 226a, 226b, web 228a and sealing surfaces 230, 232 are each mechanically coupled to interior surface 226 of socket 224. Upper end of web 228a also includes an inwardly extending projection 240a on its interior surface for receipt in recess 226c so that that rim sealing surface 240 also mechanically coupled to interior surface 226 of socket 224. Though it should be understood that a separate rim sealing surface may be provided.

Although illustrated as being aligned with a respective sealing surface, engagement structures formed by projections 230a, 232a, and 240a may be offset from sealing surfaces 230, 232, and/or 240. Further, the number of projections may be decreased or increased and need not match the number of sealing surfaces. Further, as would be understood from the description that follows, the materials forming projections 230, 232a, and/or 240a may be different from the material forming sealing surfaces 230, 232, and/or 240.

The pipe sealing surfaces 230, 232 and rim sealing surface 240 can optionally be bonded with the interior surface 226 in recesses or grooves 226a, 226b, and 226c using an adhesive or a weld. In one example, sealing surfaces 230, 232, and 240 are molded, such as by silicone injection molding, into a single unitary sealing assembly with web 228a, such as shown in FIG. 15, which facilitates placement and replacement.

In the illustrated embodiment, web 228a is configured so that sealing surfaces 230 and 232 project radially outward of web 228a sufficiently for receipt into recesses or grooves 226a, 266b, and/or 226c but also so that web 228a contacts the interior surface 226 of socket 222. In this manner, web 228a and sealing surfaces 230 and 232 may follow the interior surface of socket 224 and so that web 228a may also be coupled to the interior surface 226 of socket 224, such as shown in FIG. 14.

Further, sealing surfaces 230, 232, and 240 and web 228a are optionally molded with the interior surface of socket 224 using two shot molding so that the respective sealing surfaces and web are integrally joined with the interior surface 226. For example, socket 224 can be made from a suitable polymeric material, such as polyvinylchloride, through an injection molding process, and sealing surfaces 230, 232, and 240 may be formed during a separate injection molding process to bond the sealing surfaces 230, 232, and 240 to the surfaces of socket 224.

Alternately, seal assembly 228 or at least the projections (which forms sealing surfaces 230, 232, and/or 240) may be formed from a sealant material that allows a snap fit coupling of seal assembly 228 in a pipe or pipe coupler, such as socket 224. In this manner, sealing assembly may be retro fit into a pipe or pipe coupler, for example, when the manufactured seals or original seals are damaged or have deteriorated.

In one embodiment, sealing surfaces 230, 232, and 240 are formed from silicone or silicone-based material due at least in part to its elastomeric and stress relaxation characteristics. Silicone-based materials can also be relatively resistant to heat compared to other elastomers and can generally provide acceptable or better sealing pressure when used with the coupling assembly 220.

For further details of locking ring 222 reference is made to locking ring 122.

In the illustrated embodiment, rim sealing surface 240 extends below the angled surface of the locking and couples to interior surface 226, as noted above, via groove 226c, which is also below the rim angled surface. Optionally, rim sealing surface 240 extends only partially across the rim, which allows for dual compression from the inserted tube F and the locking ring. In addition, sealing surfaces 230, 232, and/or 240 may be formed from different materials and from different material than web 228, which allows seal assembly 220 to exhibit different properties as needed.

Thus, when the tube is inserted, the tube applies force on the inwardly facing sides of sealing surfaces 230, 232 and 240, which in turn create a force on the back side of sealing surfaces 230,232, and 240 thereby sealing the back of the cylindrical sleeve 228a against socket 224. Recesses or channels 226a, 226b, and 226c therefore help keep the seal assembly in place and create back side sealing locations.

Accordingly, the pipe coupling assemblies described herein provides multiple sealing surfaces that seal against an outside surface of an end portion of a pipe inserted into the pipe coupling assembly. At least one of the sealing surfaces is compressed as the inserted end portion and the pipe coupling assembly are drawn together into a fully installed position.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

We claim:

1. A pipe coupling assembly comprising:
    a socket comprising:
        a sleeve portion including an exterior surface and an interior surface defining an interior of the socket;
        a rim defining an opening into the interior of the sleeve portion;
        a rim sealing surface surrounding the rim, the rim sealing surface adapted to form a liquid-tight seal wherein the rim is angled inward toward the opening; and
        at least one socket sealing surface disposed in the interior surface of the sleeve portion and adapted to form a liquid-tight seal; and
    a locking ring adapted to receive the socket, the locking ring comprising a first end and a second end connected by a body portion having an interior surface, the first end having a flange adapted to engage and compress the rim sealing surface when the locking ring is mounted and locked onto the socket wherein the compressed rim sealing surface and the at least one socket sealing surface provide at least two liquid-tight seals around an end portion of a pipe inserted into the socket.

2. The pipe coupling assembly of claim 1 wherein at least two socket sealing surfaces are disposed in the interior surface of the sleeve portion and adapted to form a liquid-tight seal, wherein the compressed rim sealing surface and the at least two socket sealing surfaces provide at least three liquid-tight seals around an end portion of a pipe inserted into the socket.

3. The pipe coupling assembly of claim 2 wherein each of the at least two socket sealing surfaces comprise a gasket bonded with the interior surface of the sleeve portion.

4. The pipe coupling assembly of claim 1 wherein at least one of the sealing is an integrally molded gasket.

5. The pipe coupling assembly of claim 1 wherein the rim sealing surface and the at least one socket sealing surfaces comprise injection molded silicone.

6. The pipe coupling assembly of claim 1 wherein the first end portion comprises an uninterrupted exterior surface.

7. A pipe coupling assembly comprising:
    a socket comprising:
        a sleeve portion including an exterior surface and an interior surface defining an interior of the socket;
        a rim defining an opening into the interior of the sleeve portion;
        a rim sealing surface surrounding the rim, the rim sealing surface adapted to form a liquid-tight seal; and
        at least one socket sealing surface disposed in the interior surface of the sleeve portion and adapted to form a liquid-tight seal; and
    a locking ring adapted to receive the socket, the locking ring comprising a first end and a second end connected by a body portion having an interior surface, the first end having a flange adapted to engage and compress the rim sealing surface when the locking ring is mounted and locked onto the socket wherein the compressed rim sealing surface and the at least one socket sealing surface provide at least two liquid-tight seals around an end portion of a pipe inserted into the socket;
    a plurality of projections extending from one of the exterior surface of the sleeve portion or the interior surface of the body portion, with the other of the exterior surface of the sleeve portion or the interior surface of the body portion comprising a plurality of channels adapted to receive the plurality of projections, each channel comprising a channel inlet connected with a channel end portion by a neck portion, the neck portion extending at an angle relative to the second pipe rim, wherein the locking ring is adapted to move relative to the socket between (a) an unlocked condition in which the locking ring surrounds the socket and each of the channel inlets is aligned with one of the plurality of projections, and (b) a locked condition in which the projection is received within the channel end portion and the flange compresses the rim sealing surface; and
    wherein the plurality of projections includes upper and lower camming surfaces adapted to ride along the channel angled neck portion as the locking ring is moved between the unlocked and the locked conditions.

8. The pipe coupling assembly of claim 7 wherein the upper and lower camming surfaces are disposed at angle relative to the socket rim.

9. The pipe coupling assembly of claim 8 wherein the angle of the upper and lower camming surfaces is the same as the angle of the neck portion.

10. The pipe coupling assembly of claim 9 wherein the angle is 9 to 12 degrees.

11. The pipe coupling assembly of claim 7 wherein an amount of the plurality of channels, a length of the channel neck portion, the angle of the channel neck portion relative to the socket rim, or a combination thereof is adapted to provide the predetermined amount of rim sealing surface compression upon a quarter turn or less of the locking ring.

12. A pipe coupling assembly comprising:
    a socket comprising:
        a sleeve portion including an exterior surface and an interior surface defining an interior of the socket;
        a rim defining an opening into the interior of the sleeve portion;
        a rim sealing surface surrounding the rim, the rim sealing surface adapted to form a liquid-tight seal; and
        at least one socket sealing surface disposed in the interior surface of the sleeve portion and adapted to form a liquid-tight seal; and
    a locking ring adapted to receive the socket, the locking ring comprising a first end and a second end connected by a body portion having an interior surface, the first end having a flange adapted to engage and compress the rim sealing surface when the locking ring is mounted and locked onto the socket wherein the compressed rim sealing surface and the at least one socket sealing surface provide at least two liquid-tight seals around an end portion of a pipe inserted into the socket; and wherein the rim sealing surface comprises a gasket bonded with the rim.

13. The pipe coupling assembly of claim 12 wherein the rim is angled inward toward the socket opening.

14. The pipe coupling assembly of claim 13, further comprising a plurality of projections extending from one of the exterior surface of the sleeve portion or the interior surface of the body portion, with the other of the exterior surface of the sleeve portion or the interior surface of the body portion comprising a plurality of channels adapted to receive the plurality of projections, each channel comprising a channel inlet connected with a channel end portion by a neck portion, the neck portion extending at an angle relative to the second pipe rim, wherein the locking ring is adapted to move relative to the socket between (a) an unlocked condition in which the locking ring surrounds the socket and each of the channel inlets is aligned with one of the plurality of projections, and (b) a locked condition in which the projection is received within the channel end portion and the flange compresses the rim sealing surface.

15. The pipe coupling assembly of claim 14 wherein a length of the channel neck portion, the angle of the channel neck portion relative to the socket rim, or both is configured to provide a predetermined amount of rim sealing surface compression when the locking ring is in the locked condition.

16. The pipe coupling assembly of claim 14 wherein the plurality of projections comprises four projections spaced equidistant about the circumference of one of the sleeve portion or the locking ring body.

17. An under-sink waste pipe system for transporting liquid from a sink basin to a drain, the pipe system comprising:
  a first pipe having a first end portion;
  a second pipe having a socket formed in a second end portion of the second pipe, the socket adapted to receive the first end portion of the first pipe therein, the socket comprising:
    a rim defining an end opening through which the portion of first end portion of the first pipe is inserted into the socket, the rim comprising a rim sealing surface adapted to form a liquid-tight seal around the first end portion; and
    a sleeve portion including an exterior surface and an interior surface defining an interior space for receiving the first end portion, the interior surface comprising at least two socket sealing surfaces adapted to form a liquid-tight seal around the first end portion;
  a locking ring for coupling the first pipe and the second pipe, the locking ring comprising a first end and a second end connected by a body portion, the first end having a flange defining an opening through which the first end portion of the first pipe is inserted, the flange adapted to engage the rim sealing surface when the locking ring surrounds the socket; and
  a plurality of projections extending from one of the exterior surface of the sleeve portion or an interior surface of the body portion, with the other of the exterior surface of the sleeve portion or the interior surface of the body portion comprising a plurality of channels adapted to receive the plurality of projections, each channel comprising a channel inlet connected with a channel end portion by a neck portion, the neck portion extending at an angle relative to the second pipe rim, wherein the locking ring is adapted to move relative to the socket between (a) an unlocked condition in which the locking ring surrounds the socket and each of the channel inlets is aligned with one of the plurality of projections, and (b) a locked condition in which the projection is received within the channel end portion, wherein when the locking ring is placed over the socket in the unlocked condition and the first end portion is inserted into the socket through the locking ring opening, rotation of the locking ring from the unlocked to the locked condition draws the flange toward the rim sealing surface such that the flange compress the rim sealing surface to form the liquid-tight seal around the first end portion, and wherein when the locking ring is in the locked condition, the compressed rim sealing surface and the at least two socket sealing surfaces provide at least three liquid-tight seals around the first end portion of the first pipe wherein the plurality of projections include upper and lower camming surfaces adapted to ride along the channel angled neck portion as the locking ring is moved between the unlocked and the locked conditions.

18. The under-sink waste pipe system of claim 17 wherein the upper and lower camming surfaces are disposed at angle relative to the second pipe rim, and optionally the angle of the upper and lower camming surfaces is the same as the angle of the neck portion.

* * * * *